Figure 1:
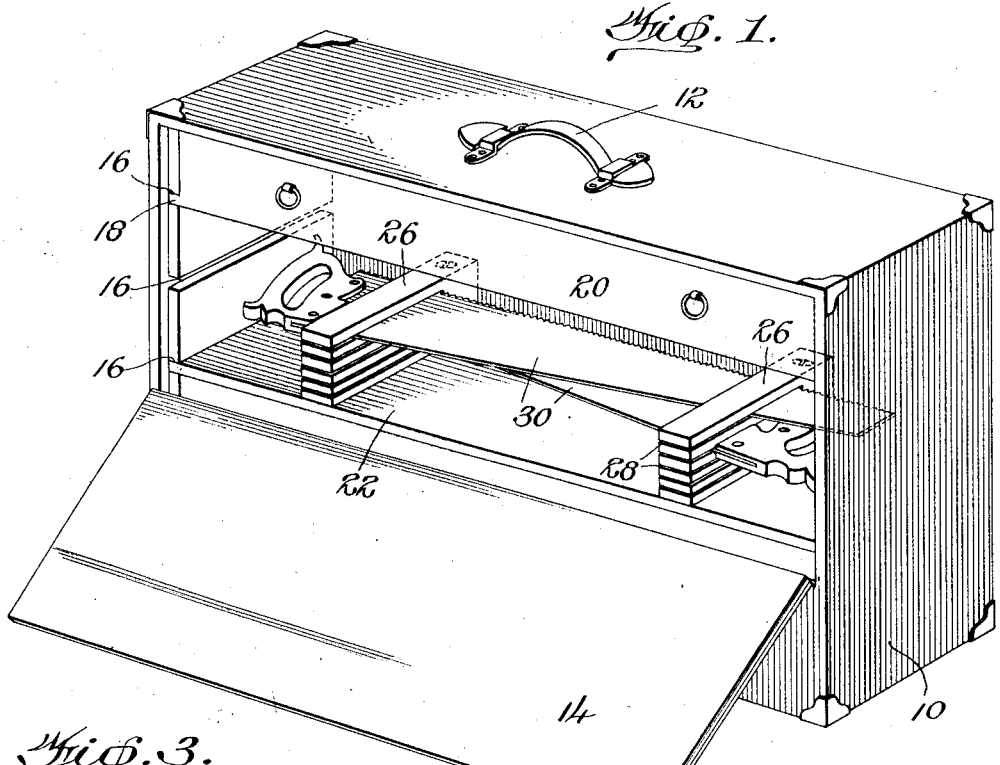

Feb. 28, 1928.

G. M. HUSON 1,661,121

TOOL CHEST

Filed April 27, 1926

Inventor
George M. Huson,
by Bright & Bailey
Attorneys

Patented Feb. 28, 1928.

1,661,121

UNITED STATES PATENT OFFICE.

GEORGE M. HUSON, OF ROCKFORD, ILLINOIS.

TOOL CHEST.

Application filed April 27, 1926. Serial No. 104,914.

My invention relates to tool chests and my object, generally speaking, is to provide a strong, durable, inexpensive, portable tool chest having tool receiving drawers or compartments so arranged that access may readily be had to any one of them.

More particularly it is my purpose to provide, as a part of a tool chest, a saw rack which, when positioned within the chest, not only will hold a plurality of saws against injurious contact with one another and against injurious contact with other tools, but which will form a closure for one of the tool receiving drawers or compartments of the chest. My purpose, moreover, is to provide a saw rack as mentioned which may be removed from the chest with which it is associated and used independently of said chest to support a plurality of saws out of contact with one another in convenient position for selective use.

With the foregoing and other purposes in view, my invention consists in the novel features of construction, combination and arrangement of parts as will hereinafter be more fully described, illustrated in the accompanying drawings and defined in the appended claims.

Figure 2:
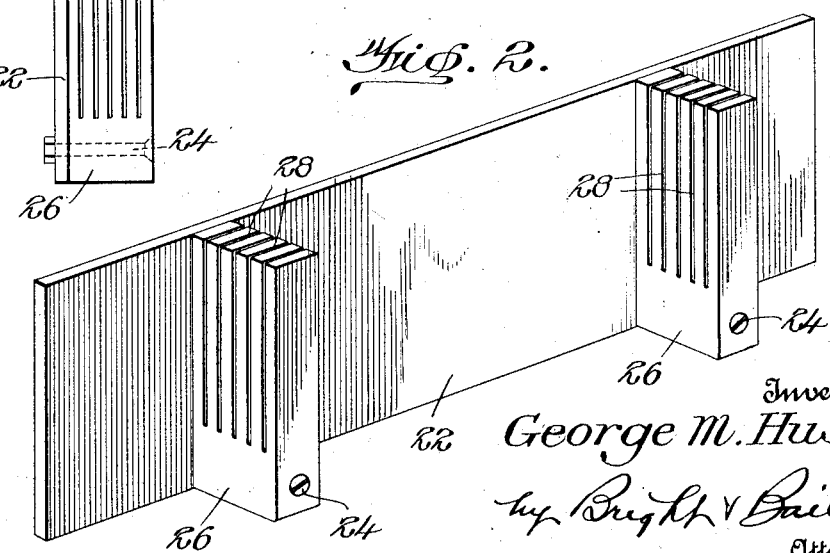

In the drawings, wherein like characters of reference denote corresponding parts in the different views:

Fig. 1 is a perspective view of a tool chest embodying the novel and essential features of my invention;

Fig. 2, a perspective view of the saw rack removed from the chest; and

Figure 3:
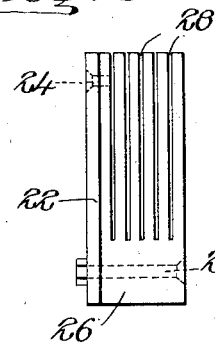

Fig. 3, an end view of the saw rack.

By reference to the drawings it will be observed that my improved tool chest includes a casing 10 which is of elongated, rectangular shape, preferably of greater depth than width, formed from any suitable or desired material and provided with a handle 12 whereby it may be carried in the manner of a suitcase, which latter it is constructed to resemble.

Access to the interior of casing 10 is afforded through an opening in one of the sides thereof normally closed by a door 14, said opening extending the full length of the casing and from the top thereof to a point adjacent to but short of its bottom, whereby a tool receiving compartment with an open top is formed in the lower portion of the casing.

Horizontally extending channels 16 are provided in any suitable manner at vertically spaced intervals upon the inner faces of the ends of casing 10, certain pairs of said channels being adapted to slidably receive extensions 18 at the ends of a tool receiving drawer or drawers 20 and another pair, the lowermost pair, being adapted to slidably receive the ends of a shelf-like member 22 which, when positioned within casing 10, forms a closure for the open top of the compartment in the bottom of said casing as is obvious.

Secured by means of screws, bolts or other suitable fasteners 24 at spaced points against one side of member 22 is a pair of blocks 26, 26 of duplicate construction, each block having a plurality of parallel kerfs 28 cut therein so that companion pairs of kerfs of the respective blocks may receive the blades of a plurality of saws 30 as shown in Fig. 1 to hold said saws out of injurious contact with one another, either when the member 22 is placed within casing 10, or when it is removed from said casing and set up upon its edge to be used as a saw rack separate and distinct from the casing, it being noted in this latter connection that the blocks 26, 26 are disposed transversely of shelf-like member 22 and that one end of each of said blocks is disposed flush with one edge of said member 22 whereby the saw rack is adapted to be set up upon one edge as stated and whereby it is unlikely, when so set up, to tilt or fall over.

The drawer or drawers 20 may selectively be pulled either partially or entirely out of casing 10 to afford ready access to the contents thereof, and when member 22 is removed from the casing convenient access is afforded to the compartment at the bottom of the latter. Moreover, the blocks 26, 26 serve to strengthen member 22 as well as to provide means whereby said member may be set up upon one edge to constitute a saw rack separate and distinct from casing 10, and when the drawer or drawers 20 and member 22 are positioned within casing 10 and door 14 is closed the chest presents a neat appearance and is capable as aforesaid of being readily carried in the manner of a suitcase.

From the foregoing description considered in connection with the accompanying drawings it is believed that the construction and advantages of my improvements will be fully understood. It is desired to point out, however, that various changes and minor additions may be made in and to the structure shown within the spirit and scope of my invention as defined in the appended claims.

I claim:

A tool chest including a casing, a shelf-like member removably engageable within said casing, and a pair of blocks mounted transversely across one side of said member, said blocks having kerfs formed therein parallel to the plane of said member to receive saw blades whereby a plurality of saws may be supported out of injurious contact with one another, said member being adapted when removed from said casing to be set up upon one edge thereof to constitute a saw rack separate and distinct from said casing, one end of each of said blocks being terminated flush with an edge of said member to hold the latter against tilting movement or from falling over upon one side when it is set up upon one edge.

In testimony whereof I hereunto affix my signature.

GEORGE M. HUSON.